United States Patent
Nemer et al.

(10) Patent No.: US 10,627,363 B2
(45) Date of Patent: Apr. 21, 2020

(54) OXYGEN SENSING PROBE/ANALYZER

(71) Applicant: Rosemount Inc., Shakopee, MN (US)

(72) Inventors: Joseph C. Nemer, Mayfield Heights, OH (US); Mark D. Stojkov, Parma, OH (US)

(73) Assignee: Rosemount Inc., Shakopee, MN (US)

( * ) Notice: Subject to any disclaimer, the term of this patent is extended or adjusted under 35 U.S.C. 154(b) by 217 days.

(21) Appl. No.: 15/148,436

(22) Filed: May 6, 2016

(65) Prior Publication Data
US 2016/0327509 A1   Nov. 10, 2016

Related U.S. Application Data

(60) Provisional application No. 62/157,537, filed on May 6, 2015.

(51) Int. Cl.
*G01N 27/409* (2006.01)
*G01N 27/407* (2006.01)

(52) U.S. Cl.
CPC ....... *G01N 27/4078* (2013.01); *G01N 27/409* (2013.01); *G01N 27/4073* (2013.01)

(58) Field of Classification Search
CPC .......... G01N 27/4078; G01N 27/4073; G01N 27/409
See application file for complete search history.

(56) References Cited

U.S. PATENT DOCUMENTS

| | | | |
|---|---|---|---|
| 4,154,664 A | 5/1979 | Renevot | |
| 6,672,132 B1 | 1/2004 | Weyl et al. | |
| 8,635,899 B2 | 1/2014 | Bailey | |
| 2004/0149579 A1* | 8/2004 | Palmer | G01N 27/4074 |
| | | | 204/431 |

FOREIGN PATENT DOCUMENTS

| | | |
|---|---|---|
| CN | 1434293 A | 8/2003 |
| CN | 104048995 A | 9/2014 |
| EP | 1327880 A2 | 7/2003 |

OTHER PUBLICATIONS

Lucas Milhaupt (Brazing vs. Welding, first available online Dec. 11, 2011).*
Product Data Sheet for In Situ Oxygen Transmitter, dated May, 2010, Rosemount Analytical, Inc., 20 pages.
(Continued)

*Primary Examiner* — Gurpreet Kaur
*Assistant Examiner* — Steven E Rosenwald
(74) *Attorney, Agent, or Firm* — Christopher R. Christenson; Kelly, Holt & Christenson PLLC

(57) ABSTRACT

A probe gas analysis system is provided. The probe gas analysis system comprises a probe body configured to be exposed to a source of process gas. The probe gas analysis system also comprises a sensor cell assembly having a sensor cell with a sensing side and a reference side. The sensing side is disposed to contact the source of process gas, and to generate a signal indicative of a detected difference in oxygen concentration between the reference side and the sensing side. The probe gas analysis system also comprises a substantially permanent seal coupling the sensor cell assembly to the probe body, wherein the substantially permanent seal separates the reference side from the sensing side.

14 Claims, 4 Drawing Sheets

(56) References Cited

OTHER PUBLICATIONS

International Search Report and Written Opinion for International Application No. PCT/US2016/031227, dated Aug. 17, 2016, date of filing: May 6, 2016, 14 pages.
First Examination Report. dated Apr. 4, 2018, for Australian Patent Application No. 2016256898, 3 pages.
European Search Report for European Patent Application No. 16790160.2, dated Aug. 29, 2018, 12 pages.
Second Australian Examination for Australian Patent Application No. 2016256898, dated Sep. 29, 2018, 3 pages.
First Chinese Office Action dated Mar. 12, 2019, for Chinese Patent Application No. 201680025603.4, 20 pages including English translation.
Second Office Action for Chinese Patent Applicaton No. 201680025603.4 dated Sep. 19, 2019, 19 pages with English Translation.

* cited by examiner

OXYGEN SENSING PROBE/ANALYZER

CROSS-REFERENCE TO RELATED APPLICATIONS

The present application is based on and claims the benefit of U.S. Provisional Patent Application Ser. No. 62/157,537 filed May 6, 2015, the content of which is hereby incorporated by reference in its entirety.

BACKGROUND

Industrial processes often rely on energy sources such as combustion to generate steam or as heat for a feedstock liquid. Some combustion processes involve operation of a furnace or boiler. While combustion provides a relatively low cost energy source, combustion efficiency is often sought to be maximized within a process, because the resulting flue gases exiting the system may be subject to regulations regarding emissions of harmful gases. Accordingly, one goal of the combustion process management industry is to maximize combustion efficiency of existing furnaces and boilers, which inherently reduces the production of greenhouse gases or other harmful byproducts. Combustion efficiency can be optimized by maintaining the ideal level of oxygen in the exhaust or flue gases coming from a combustion process which ensures oxidation of combustion byproducts.

In situ or in-process analyzers are commonly used in monitoring, optimizing, and/or controlling an on-going combustion process. Typically, such analyzers employ sensors configured to be heated to, and withstand, relatively high temperatures, and to operate directly above, or near, the furnace or boiler combustion zone. Known process combustion analyzers typically employ a zirconia oxide sensor disposed at one end of a probe that is inserted directly into a flue gas stream. As the exhaust or flue gas flows into the sensor, it diffuses through a filter, often called a diffuser, into proximity with the sensor. There are no pumps or other flow inducing devices used to direct a sample flow into the sensor, instead, the gas is diffused passively through the diffuser filter. The sensor provides an electrical signal related to the amount of oxygen present in the gas. While the diffuser allows diffusion therethrough, it also protects the sensor from physical contact with airborne solids or particulates.

SUMMARY

A probe gas analysis system is provided. The probe gas analysis system comprises a probe body configured to be exposed to a source of process gas. The probe gas analysis system also comprises a sensor cell assembly having a sensor cell with a sensing side and a reference side. The sensing side is disposed to contact the source of process gas, and to generate a signal indicative of a detected difference in oxygen concentration between the reference side and the sensing side. The probe gas analysis system also comprises a substantially permanent seal coupling the sensor cell assembly to the probe body, wherein the substantially permanent seal separates the reference side from the sensing side.

DETAILED DESCRIPTION

Figure 1:
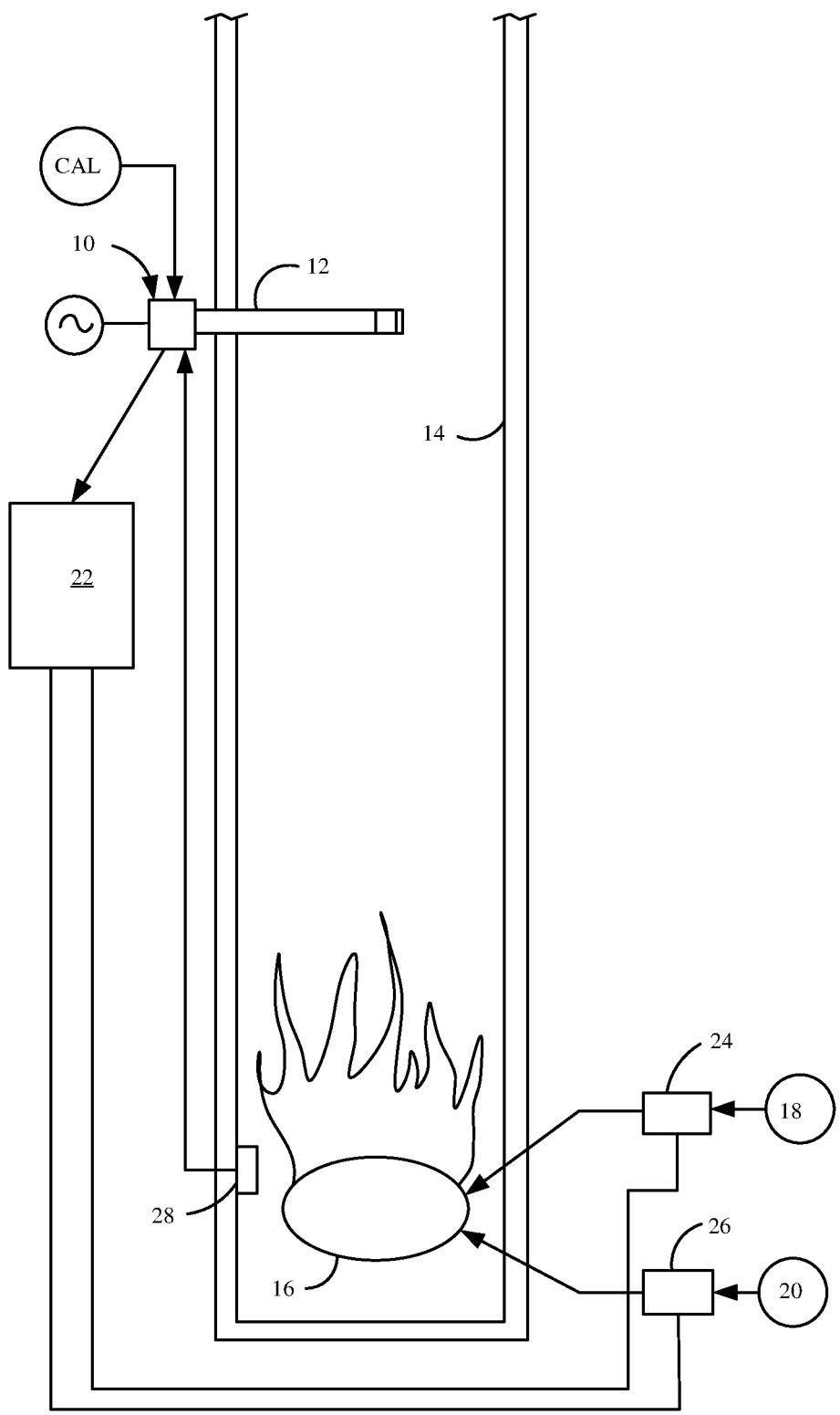
FIG. 1 is a diagrammatic view of an in situ process oxygen analyzer/transmitter with which embodiments of the present invention are particularly applicable.

Some oxygen measurement systems employ a zirconia oxide sensor cell. Zirconia oxide sensor cells function by detecting differential oxygen concentration between two sides of a sensor, a sensing side and a reference side. A reference gas with a known oxygen concentration is often used on the reference side of the sensor. For some applications, ambient air serves as a reference gas. The other side of the sensor is subjected to the environment for which oxygen measurement is desired. The environment may be, for example, a flue gas or exhaust stream of a combustion system. Based on the known concentration of the reference gas, and a detected differential between the reference side and the sensor side, the oxygen content of the measured environment can be calculated.

Traditional oxygen probes use a gasket as a seal between a sensing side and a reference side of the sensor. Gaskets, however, have some known limitations that both increase costs and present failure risks when used in an oxygen-sensing probe. For example, gaskets may leak initially and/or develop a leak over time. Because of the risk of gasket-related leaks, oxygen probes relying on gasket-based seals may require frequent quality testing to detect any leak-induced deviation in oxygen measurements, as a leaky gasket may result in an erroneous oxygen concentration differential measurement as reference gas leaks from the reference side to the sensing side of a sensor or vice versa.

In at least some installations, gaskets also require precision specifications, which may contribute to overall costs, both to initially install and to replace or repair over time. Even the best gaskets available on the market are not sufficient to completely eliminate a risk of leakage during an operational life of a sensor. Additionally, leaks are amplified when the probe is operating in a real process, where there is a pressure differential between the process side and the reference side, which heightens the risk of a leak developing in a gasket-based seal. Therefore, even an instrument with an initially effective gasket seal is limited by the leak rate on the precision of the measurements possible. Use of a gasket as a seal, then, limits, or even prevents the ability to use such a probe in a high-precision application.

An additional limitation present with gasket-based seals in oxygen sensor probe constructions is that the process of testing for a leak in a production environment can be costly, complicated, and time-consuming. It is desired, therefore, to construct a zirconia oxide sensor cell without a gasket between the sensing side and the reference side of the sensor, but with a sufficient seal to ensure that the leak risk is reduced. It is also desired that a zirconia oxide sensor cell construction have lower costs, simpler manufacturing, and simpler quality testing when compared to some current gasket-based probe models on the market.

Some embodiments disclosed herein generally address the issue of leaks, simplify the manufacturing/testing process, and reduce the cost of an oxygen sensing probe. Further, at least some disclosed embodiments may be configured to support precision measurement applications that are otherwise not possible using traditional gasket sealing techniques. Embodiments of the present invention generally provide for a welded coupling between an oxygen sensor and a body of a sensor probe. Welding, or otherwise permanently sealing the sensor cell assembly to the probe body, as compared to sealing with a gasket, provides a complete seal of the opening between the sensing side and the reference side of the sensor. A welded seal reduces the possibility of leaks that are common with gasket seals. Thus, at least some embodiments disclosed herein eliminate the requirements of gaskets and their associated torque specifications, reduce the overall cost of the device, while allowing for new precision measurement applications for such sensor cells, specifically zirconia oxide sensor cells.

FIG. 1 is a diagrammatic view of an in-situ process oxygen analyzer/transmitter with which embodiments of the present invention are particularly applicable. Transmitter 10 may be, for example, a Model 6888 Oxygen Transmitter available from Rosemount Analytical Inc., of Solon, Ohio (an Emerson Process Management Company). Transmitter 10, in one embodiment, comprises a probe assembly 12 substantially disposed within a stack or flue 14 of a combustion process. Transmitter 10, in one embodiment, is configured to measure oxygen concentration within the flue gas produced by, or otherwise related to, combustion occurring at burner 16. Burner 16 may, in one embodiment, be operably coupled to a source of air, or other oxygen source 18, as well as a combustion fuel source 20. As transmitter 10 is configured to be exposed to the combustion zone, in one embodiment, it is constructed to withstand high temperatures.

Each of oxygen source 18 and fuel source 20 is controllably coupled to burner 16, in one embodiment, and configured to allow an operator, or a process controller, to control an ongoing combustion process. Transmitter 10, in one embodiment, is configured to measure oxygen concentration in the combustion exhaust flow, and provide the indication to combustion controller 22. Controller 22, in one embodiment, controls one or both of valves 24 and 26, for example in response to an indicated oxygen concentration, to provide a closed loop combustion control system. In one embodiment, controller 22 may operate autonomously, controlling one or both of valves 24 and 26 in response to detected oxygen concentrations in the flue gas. In another embodiment, controller 22 operates semi-autonomously, or requires at least some manual control by an operator. In one embodiment, the indicated oxygen concentration is an absolute concentration, for example expressed as a percentage. In another embodiment, the indicated oxygen concentration is expressed as a relative measurement, for example as a differential with respect to a known reference gas oxygen concentration.

Figure 2:
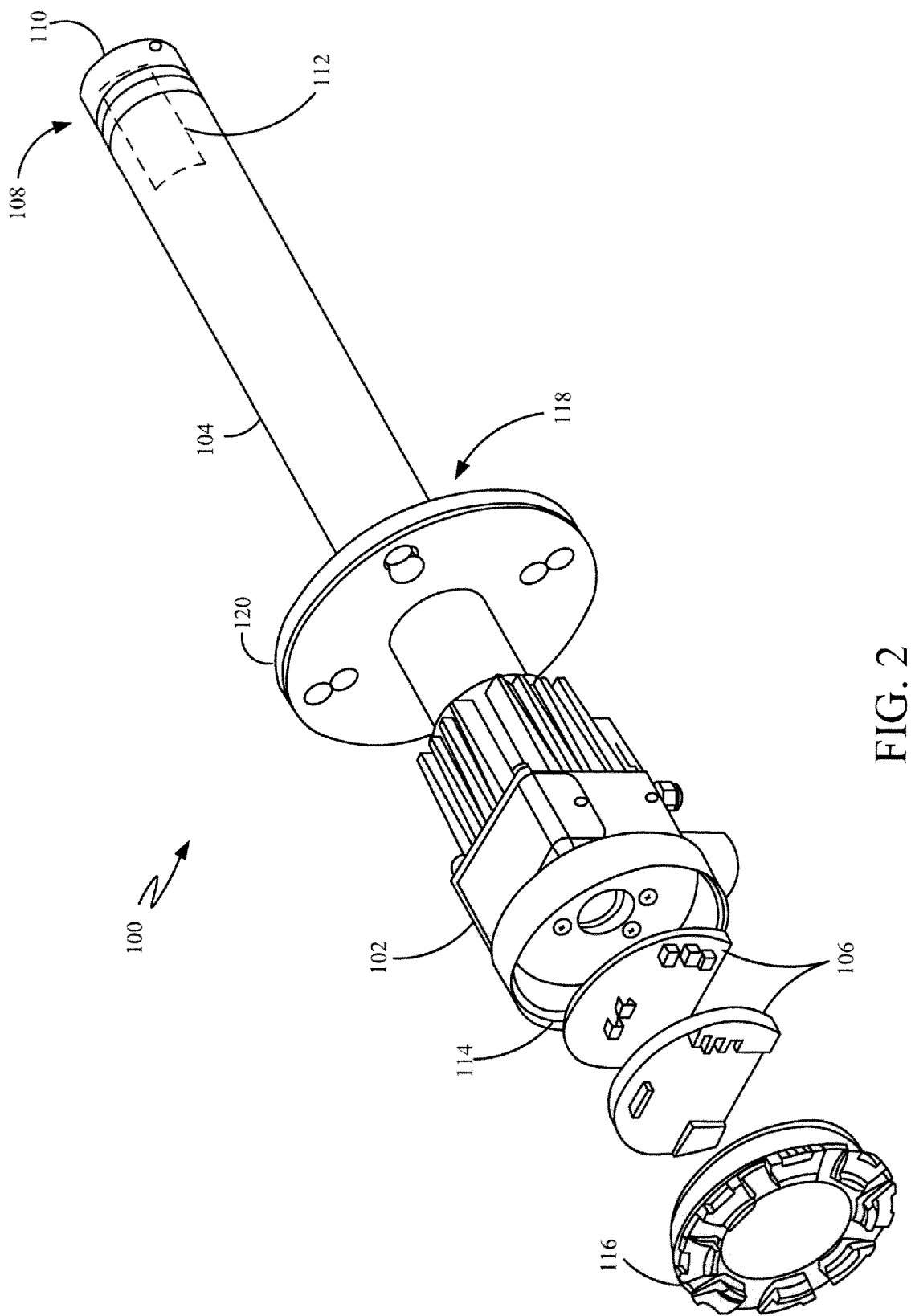
FIG. 2 is a diagrammatic perspective view of a combustion oxygen transmitter with which embodiments of the present invention are particularly applicable.

FIG. 2 is a diagrammatic perspective view of a combustion oxygen transmitter with which embodiments of the present invention are particularly applicable. Transmitter 100, in one embodiment, comprises a housing 102, a probe 104, and electronics 106. Probe 104, in one embodiment, comprises a distal end 108 where a diffuser 110 may be mounted, in one embodiment. Diffuser 110, in one embodiment, comprises a physical device configured to allow at least some gaseous diffusion therethrough, but otherwise protect components within probe 104. Specifically, diffuser 110 protects a measurement cell, or sensor 112, illustrated in phantom in FIG. 2.

Housing 102, in one embodiment, comprises a chamber 114 that, in one embodiment, is sized to house electronics 106. Additionally, in one embodiment, housing 102 may comprise internal threads configured to receive and mate with external threads of an endcap 116. The combination of the internal threads and the external threads, in one embodiment, form a hermetic seal configured to protect electronics 106. Additionally, housing 102, in one embodiment, comprises a bore or aperture therethrough allowing electrical interconnection between electronics 106 and sensor 112.

In one embodiment, sensor 112 is welded to distal end 108 of probe 104. One embodiment of the coupling of sensor 112 to distal end 108 is shown in greater detail in FIG. 3, discussed below. Welding a sensor 112 to distal end 108 of probe 104, for example, provides a variety of advantages over previous constructions. For example, the manufacturing process of welding sensor 112 to distal end 108 may result in a lower manufacturing cost and reduced parts required for assembly, both of which may simplify the manufacturing process and overall sensor cost. Additionally, welding sensor 112 to distal end 108 of probe 104 also lowers requirements for precision parts, both for a manufacturer initially producing transmitter 100, and an end user of transmitter 100 requiring replacement parts. Welding is only one example of a mechanism for providing a permanent barrier between a sensing side and a reference side of sensor 112, however other appropriate permanent sealing mechanisms could also be used, in other embodiments, for example brazing.

In an embodiment where sensor 112 is welded directly to a distal end 108 of probe 104, gaskets may be completely eliminated from the design. Another problem present with to the use of gaskets is the required torque specifications. Reducing or eliminating the use of gaskets in a transmitter design may also eliminate the need for torque specifications. Additionally, welding requires no specific parts for a manufacturer to install, reducing the complexity of manufacturing and assembling a welded transmitter 100 as compared to a conventional transmitter using a gasket seal.

Welding a sensor 112 to a distal end 108 of probe 104 may also reduce cost and efforts required of an end user. For example, welding sensor 112 to distal end 108 of probe 104 may reduce the requirements for a complicated leak test technique used to detect a leak between a reference side and a sensing side of the probe, which is often required to initially verify that a gasket-based seal has no manufacturing-related leaks. Additionally, using welding as a permanent sealing technique significantly reduces the possibility of a sensor passing a manufacturer's test, but failing for a user in the field. Further, the use of a weld-based seal may allow for an end user to use probe 104 for higher precision measurement applications. This may allow for the use of zirconia oxide sensor cells in new high precision applications that previously could not have been accomplished with zirconia oxide sensors. Additionally, welding reduces the need for a continuous flow of reference gas, allowing for ambient air to be used as the reference gas in more applications.

Probe 104 is configured to extend, in one embodiment, within a flue, for example flue 14. Probe 104 may comprise, in one embodiment, a proximal end 118 configured to be positioned adjacent to flange 120. Flange 120 is used to mount or otherwise secure transmitter 100 to a sidewall of flue 14. In one embodiment, transmitter 100 may be completely supported by the coupling of flange 120 to the flue wall.

Electronics 106 are configured to provide heater control and signal conditioning, resulting, in one embodiment, in a linear 4-20 mA signal representing flue gas oxygen. Electronics 106 may comprise a microprocessor or other suitable circuitry to measure a signal from the oxygen sensor and calculate and provide an oxygen concentration output. However, in some embodiments, transmitter 100 may simply be "a direct replacement" probe with no electronics, thus configured to send raw millivolt signals for the sensing cell and thermocouple providing indications representative of the oxygen concentration and cell temperature, respectively.

In embodiments where a "direct replacement" probe is used, the probe is coupled to a suitable analyzer. One such suitable analyzer may be the Xi operator interface, available from Rosemount Analytical, Inc. The Xi operator interface provides a backlit display, signal conditioning, and heater control within a Nema 4x (IP 66) enclosure. The electronics of the Xi operator interface also provide features, such as automatic calibration, stoichiometric indications in reducing conditions, and programmable reference features for measuring at near-ambient levels. Accordingly, the Xi operator interface includes suitable processing abilities to perform diffuser diagnostics in accordance with embodiments of the present invention. Thus, in applications where the transmitter comprises a direct replacement probe, embodiments of the present invention can still be practiced.

Figure 3:
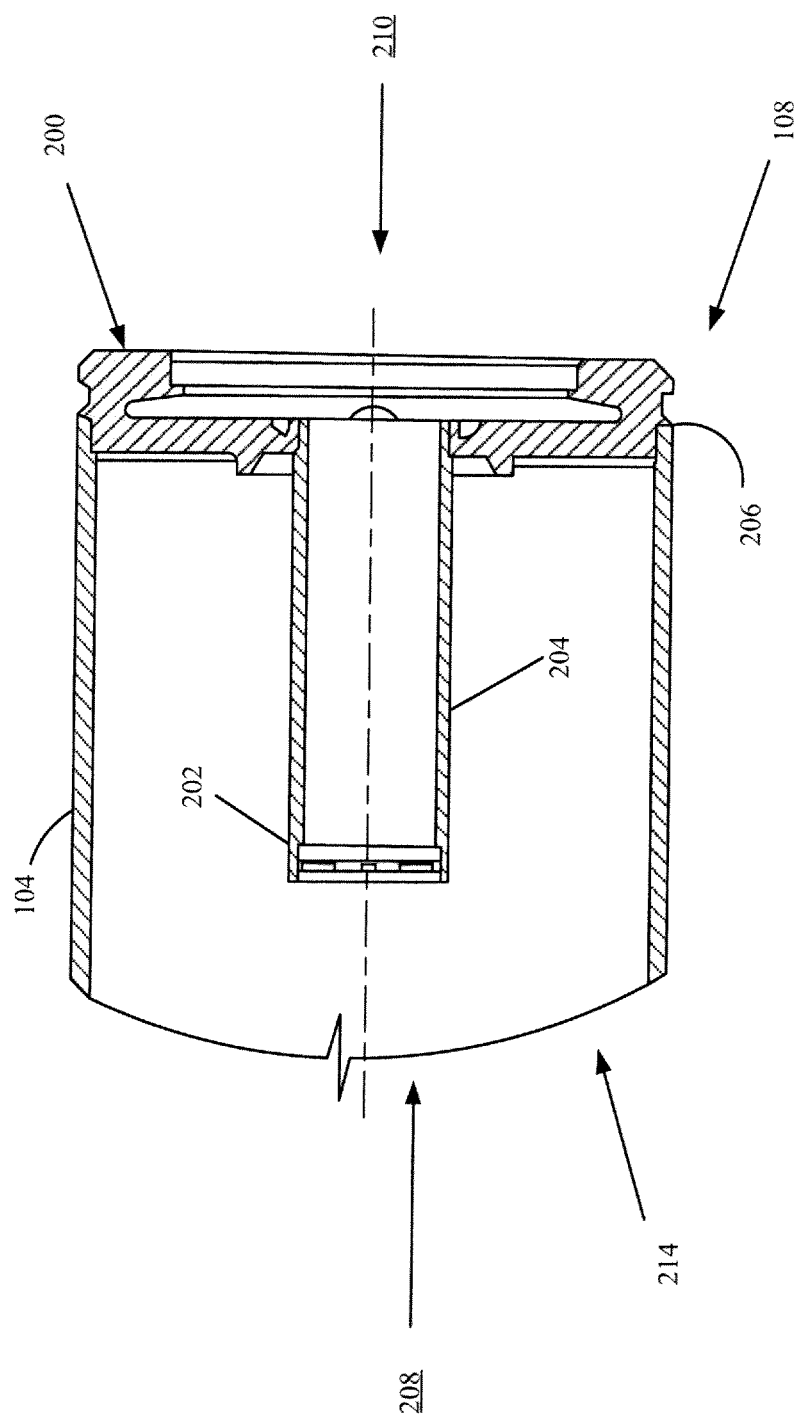
FIG. 3 is a diagrammatic view of a distal end of a probe body welded to a sensor cell in accordance with one embodiment of the present invention.

FIG. 3 is a diagrammatic view of a distal end of a probe body welded to a sensor cell in accordance with an embodiment of the present invention. Sensor cell assembly 200, in one embodiment, is permanently sealed to distal end 108 of probe body 104 at welded seal 206. In one embodiment, welded seal 206 completely encircles an interface between sensor cell assembly 200 and probe body 104, thus creating a robust seal between sensing side 210 and reference side 208. Welded seal 206, in one embodiment, couples probe body 104 to sensor cell assembly 200 such that transmitter 100 is configured to withstand combustion zone temperatures. In another embodiment, a permanent seal may be generated using other coupling mechanisms between sensor cell assembly 200 and probe 104.

Sensor cell assembly 200, in one embodiment, comprises a sensor cell 202 mounted within a tube 204. Sensor cell 202, in one embodiment, is electrically coupled to electronics 106, and provides an indication relative to the difference in oxygen concentration between reference side 208 and sensing side 210. Since the oxygen content of reference side 208 is known, a differential measurement may be directly related to the oxygen concentration at sensing side 210. Further, since assembly 200 is welded to probe body 104, a leakage risk is reduced between sensing side 210 and reference side 208.

Figure 4:
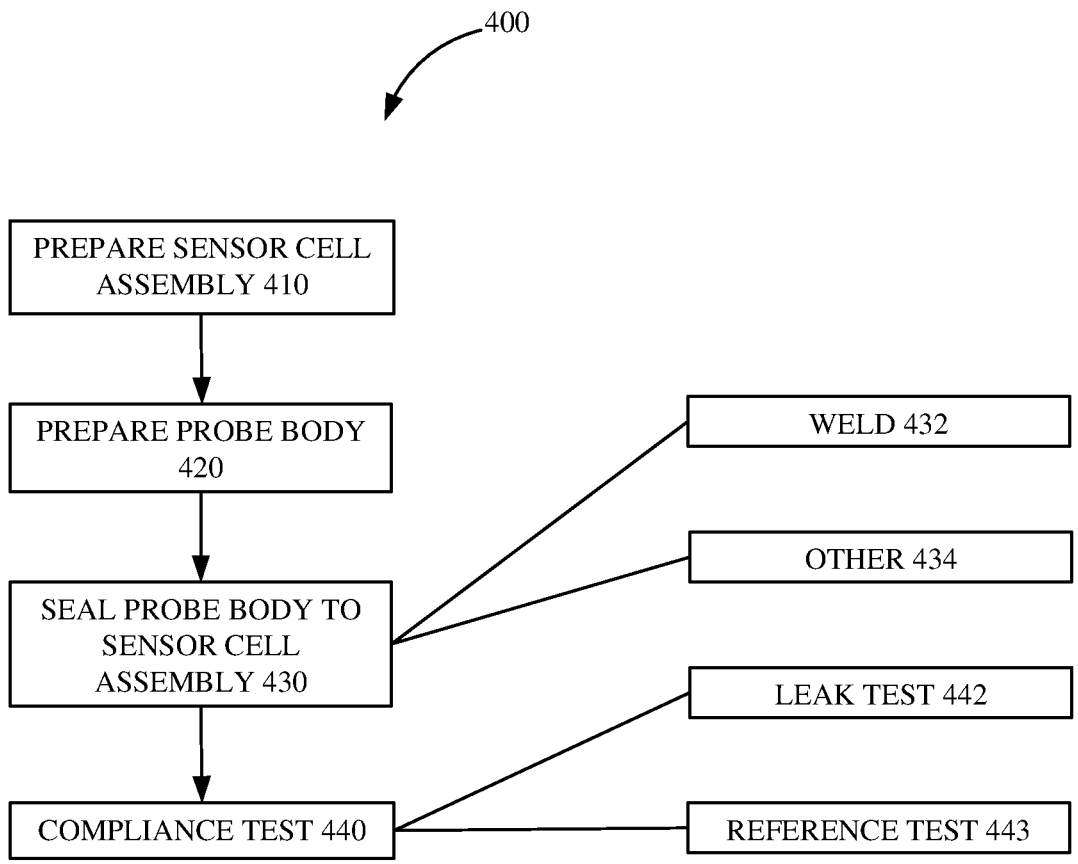
FIG. 4 is a flow diagram of a one example method for welding a probe body to a sensor cell in accordance with one embodiment of the present invention.

FIG. 4 is a flow diagram of a one example method for welding a probe body to a sensor cell in accordance with one embodiment of the present invention. Method 400 begins at block 410, where a sensor cell assembly is prepared. In one embodiment, preparing a sensor cell assembly comprises obtaining the desired sensor cell. The sensor cell assembly may be prepared, for example, according to known manufacturing processes. In one embodiment, preparing the sensor cell assembly comprises obtaining a previously manufactured, or off-the-shelf sensor cell assembly. In one embodiment, the sensor cell assembly comprises a zirconia oxide sensor assembly.

In block 420, a probe body is prepared. In one embodiment, preparing a probe body comprises preparing all electronic connections necessary for measuring and transmitting measurement indications of oxygen concentration, or other process variable.

In block 430, the probe body is sealed to a sensor cell assembly. In one embodiment, sealing comprises welding the probe body to the sensor cell assembly, as indicated in block 432. The weld, in one embodiment, comprises a continuous weld that provides a complete seal between the sensor cell assembly and the probe body such that a sealing side is sealed from a reference side. However, while the present disclosure describes welding as one method for providing a complete coupling and seal between a probe body to sensor cell assembly, it is contemplated that other permanent sealing mechanisms could be used, for example brazing, or another permanent process configured to withstand combustion temperatures, as indicated in block 434, while providing a complete seal between a reference side and a sensor side of the assembly. In one embodiment, sealing comprises providing a complete, and substantially permanent, seal between the probe body and the sensor cell, such that a reference side is completely sealed from a sensing side of the probe.

In some embodiments, a manufacturing process may also comprise conducting a compliance test, as indicated in block 440, for example, prior to a transmitter being sold or provided to an end user or installed in a process environment. A compliance test may comprise, in one embodiment, a leak test, as indicated in block 442, to detect any leaks between the reference side and the sensing side of the senor cell. In one embodiment, a compliance test comprises a reference test 442, configured to detect reference gas concentration measurements, such that in-probe reference gas specifications can be provided to a future operator. In another embodiment, other compliance-based tests may also be performed on a probe body, a sensor assembly, or an assembled transmitter. In one embodiment, the compliance test, in block 440, is conducted by an end-user prior to a first use.

It is believed that some or all embodiments described herein may provide a number of advantages. For example, some embodiments may reduce manufacturing costs or an overall part count.

Embodiments of the present invention may allow for use in applications that require higher precision measurements than could previously be performed with gasket based approaches. This may allow the use of zirconia oxide based measurements in new high precision applications.

Although the present invention has been described with reference to preferred embodiments, workers skilled in the art will recognize that changes may be made in form and detail without departing from the spirit and scope of the invention.

What is claimed is:

1. A probe gas analysis system comprising:
    a probe body configured to be exposed to a source of process gas; a sensor cell assembly having a sensor cell with a sensing side and a reference side,
    wherein the sensing side is disposed within a tube and is configured to contact the source of process gas, and to generate a signal indicative of a detected difference in oxygen concentration between the reference side and the sensing side, wherein the tube is disposed within the probe body; and
    a substantially permanent seal coupling the sensor cell assembly to the probe body,
    wherein the substantially permanent seal separates the reference side from the sensing side; and
    wherein the substantially permanent seal is a weld or a braze.

2. The probe gas analysis system of claim 1, wherein the probe body comprises a distal end, and wherein the sensor cell assembly is coupled to the probe body-at the distal end.

3. The probe gas analysis system of claim 1, wherein the weld completely encircles an interface between the sensor cell assembly and the probe body.

4. The probe gas analysis system of claim 1, wherein the sensor cell comprises a zirconia oxide sensor cell.

5. The probe gas analysis system of claim 1, wherein the reference side is disposed to contact an ambient air source.

6. The probe gas analysis system of claim 1, wherein the process gas comprises a combustion exhaust stream.

7. The probe gas analysis system of claim 1, wherein the tube comprises an end distal to the seal and wherein the sensing side of the sensor cell is disposed proximate the distal end of the tube.

8. The probe gas analysis system of claim 1, wherein the tube comprises an internal portion, and wherein the internal portion of the tube is disposed to contact the source of process gas.

9. The probe gas analysis system of claim 5, wherein the tube is sealed from the ambient air source such that the source of process gas is separate from the ambient air source.

10. A transmitter comprising:
a probe body;
a sensor cell assembly comprising;
a reference side configured, for exposure to a reference gas; a sensing side configured for exposure to a process gas, wherein the sensing side is disposed within a tube, the tube disposed within the probe body; and wherein the sensor cell is configured to sense a difference in oxygen concentration between the process gas and the reference gas; and
wherein the probe body is welded or brazed to the sensor cell assembly to form a substantially permanent seal that separates the reference side from the sensing side of the sensor cell.

11. The transmitter of claim 10, wherein the weld completely encircles an interface between the sensor cell assembly and the probe body.

12. The transmitter of claim 10, wherein the sensor cell assembly comprises a zirconia oxide sensor cell.

13. The transmitter of claim 10, wherein the tube comprises an internal, portion, and wherein the internal portion of the tube is disposed to contact the process gas.

14. The transmitter of claim 10, wherein the tube is sealed from the reference gas such that the process gas is separate from the reference gas.

* * * * *